Sept. 18, 1956  J. G. LIVINGSTONE  2,763,403
FITTINGS

Filed June 16, 1953  5 Sheets-Sheet 1

INVENTOR.
JAY G. LIVINGSTONE
BY
ATTY.

Sept. 18, 1956  J. G. LIVINGSTONE  2,763,403
FITTINGS
Filed June 16, 1953  5 Sheets-Sheet 2

INVENTOR.
JAY. G. LIVINGSTONE
BY
Gordon C. Mack
ATTY.

Sept. 18, 1956 J. G. LIVINGSTONE 2,763,403
FITTINGS

Filed June 16, 1953 5 Sheets-Sheet 3

*INVENTOR.*
JAY G. LIVINGSTONE
BY
ATTY.

Sept. 18, 1956     J. G. LIVINGSTONE     2,763,403
FITTINGS

Filed June 16, 1953     5 Sheets—Sheet 4

INVENTOR.
JAY G. LIVINGSTONE
BY
ATTY.

Sept. 18, 1956   J. G. LIVINGSTONE   2,763,403
FITTINGS
Filed June 16, 1953   5 Sheets-Sheet 5

INVENTOR.
JAY G. LIVINGSTONE
BY
ATTY

United States Patent Office 2,763,403
Patented Sept. 18, 1956

2,763,403

FITTINGS

Jay G. Livingstone, Akron, Ohio

Application June 16, 1953, Serial No. 362,046

11 Claims. (Cl. 222—111)

This invention relates to fittings to be secured to an opening of a vessel which contains fluid. The fittings are usually fastened to an opening such as the neck of a vessel through which liquid is poured. The invention relates more particularly to novel means for forming a liquid-tight seal between the fitting and the opening in the vessel. It includes the vessel and attached fitting.

The term "fitting" is used herein to describe that class of objects which includes various types of adapters through which liquid is poured from a vessel, other types of dispensers such as atomizers or the like which are fastened to the necks of bottles, and closure caps of all types which are either to be fastened directly over the opening of the vessel or to be used for covering various types of outlets employed at the opening of a vessel. The novel sealing means may be provided in any such fitting. The fittings disclosed in this application are preferably molded from plastic material. They may be formed of a relatively soft, flexible plastic, or in part of such a plastic and in part of a harder plastic. The sealing means will be formed of a flexible plastic material regardless of the composition of the remainder of the fitting.

The difficulties of adequately sealing the neck of a bottle to which, for example, a fitting such as an adapter or closure cap is threaded have long been appreciated by the bottling industry. The wall thickness of the neck of a glass bottle may vary considerably from one bottle to the next. The upper surface against which the fitting should seat may contain ridges or other irregularities which prevent a fitting from seating itself flat against it to form a seal. If the neck of the bottle is slightly out-of-round the various portions of the fitting will be distorted when they are applied to the neck of a bottle and it will be difficult to maintain a proper seal. The use of gaskets in combination with certain fittings is effective to prevent leakage but there are disadvantages to the use of them, such as the added cost of the gasket and its assembly with the particular fitting before the fitting is applied to the bottle or other vessel.

The use of bottles molded from plastics such as polyethylene, for example, is becoming quite popular in industry for a variety of purposes. Such bottles, for example, make excellent shipping containers for certain acids, solvents, etc., to which the plastic is inert. The bottles may be shipped without the danger of being broken. In the cosmetic industry cologne, perfume, deodorant, etc. are being bottled in flexible plastic bottles each equipped with an atomizer. To dispense the liquid the bottle is simply squeezed. This eliminates the need for transferring the cosmetic from the bottle to an atomizer.

The problem of sealing a flexible bottle is probably more formidable than that of sealing bottles of more rigid materials. If the neck of a flexible bottle is relatively thin, the neck has a tendency to collapse and separate from the fitting fastened to it, and usually leakage develops around the base of the fitting. Certain of the fittings described herein are provided with sealing means which are particularly effective for preventing leakage when the fitting is used with a flexible bottle.

The fittings of this invention are adapted to be fastened over openings such as the opening in the neck of a bottle or over the opening in an atomizer or other adapter fastened to a bottle. Generally, the neck or other projection to which the fitting is attached will be cylindrical, although the fittings may be designed for tubular openings which are non-cylindrical.

The improved sealing means is formed integrally with the fitting. It includes a tubular tongue which is usually adapted to contact the inner surface of the neck of the vessel either at the inner rim, or below this. In certain of the fittings the tongue is designed to contact the top surface of the neck of the bottle. The tongue is flexible and its wall length will be reduced as it is pressed into sealing contact with the neck of the bottle or other tubular member. The contacting surface of the tongue is yieldable so that it will conform to irregularities in the surface it contacts and form a liquid-tight seal. One or more tubular projections may be provided in concentric relation to the tongue for contact with the top surface of the neck of the bottle.

Plastic bottles of the type referred to above are often made so that the wall forming the neck is two or three times as thick as the sides of the bottle. This is to prevent the neck from flexing when the bottle is squeezed. The fittings used with these thick-neck bottles will usually be provided with a tongue which seals against the upper surface of the neck. When these plastic bottles are to be used for certain purposes the diameter of the opening through the neck is reamed out so that the wall thickness of the neck becomes relatively thin—about equal to the thickness of the sides of the bottle. For such a thin-neck bottle the tongue preferably extends down into the neck of the bottle or contacts the inner rim at the neck and serves to reinforce the neck to prevent it from collapsing when the bottle is squeezed. A liquid-tight seal is maintained at all times. A preferred fitting disclosed herein is designed to fit and form an effective seal on either the thin-neck or the thick-neck bottles of the same outside neck diameter. One advantage of the sealing means of this invention is that it may eventually eliminate the need for thick-neck bottles for many purposes thereby bringing about appreciable economies in this art.

A preferred type of fitting includes a pouring spout surrounded by a drain which returns liquid collected therein to the container. In this type of fitting and others in which there is a spout it may be advantageous to provide an opening to admit air to the container as liquid flows from it. If a baffle is provided as herein more particularly described, the air inlet may be located in the baffle. Alternatively, whether or not the fitting includes such a baffle, the air inlet may be located in the drain on the side of the spout opposite the lip.

The drawings are illustrative of several preferred designs of adapters and closure caps provided with the novel sealing means of this invention. In certain of the drawings only fragmentary portions of the adapter and the sealing means are illustrated. The invention is not limited to the adaptations shown. In the drawings.

Figure 1:
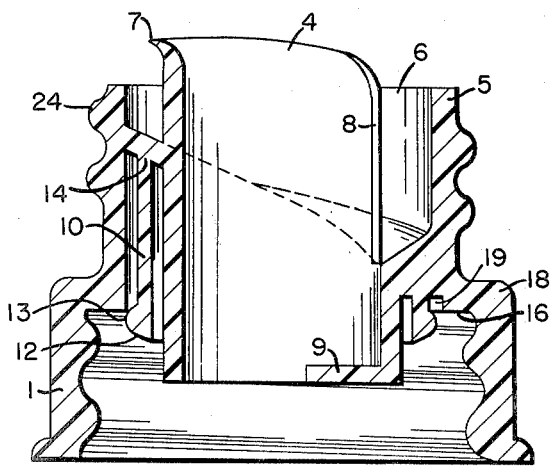
Fig. 1 is a cross-sectional view through a preferred adapter.

The drawings illustrate different applications of the sealing means. It is understood that a particular sealing means is not limited to use with the particular fitting with which it is described. The various sealing means shown may be applied to any type of fitting, such as adapters, dispensers, closure caps, etc. Unless otherwise stated, the plastic parts indicated in the drawings are flexible yielding polyethylene.

The adapter shown in Fig. 1 is a run-back adapter more particularly described in my United States Patent 2,601,039, issued June 17, 1952. The adapter is provided with an internally threaded skirt 1 which is adapted to be threaded onto the exterior threads around the neck of a bottle. The outlet or pouring tube 4 is surrounded by wall 5 which is spaced radially outward from the pouring tube. The space between the outside of the tube 4 and the wall 5 forms a channel 6. Liquid poured through the tube 4 is adapted to flow over the pouring lip 7 at the upper edge of the tube. The portion of the channel immediately under the pouring lip 7 is relatively shallow. The bottom of the channel slopes downward from the shallow portion on each side of the tube 4, becoming gradually deeper and terminating at each edge of the slot 8 which extends down the back wall of the pouring tube. Liquid which drips from the pouring lip 7 is collected in the channel immediately under the lip and drains through the channel, and back into the vessel through the slot 8. While pouring from the vessel, baffle 9 limits the amount of liquid which can be poured through the pouring tube and prevents the liquid from overflowing through slot 8.

The seal for this adapter is designed so that the adapter may be used with either a glass bottle or a flexible plastic bottle. The seal is formed by the annular tongue 10 which is formed integrally with the adapter when the adapter is molded. The tongue 10 is located between the pouring tube and the skirt 1 and is formed concentrically with respect to each of these elements. The outer surface 12 of the bead 13 around the bottom of the tongue is inclined downwardly and inwardly toward the pouring tube. The bead is appreciably thicker than the upper portion 14 of the tongue which is joined to the bottom of the portion which forms the base of the run-back channel 6. The bead 13 extends around the tongue near its bottom and projects outwardly toward the threaded skirt 1. The outside diameter of the bead is greater than the inner diameter of the neck of the bottle for which the adapter is designed.

Extending inwardly from the top of the threads in the skirt is a shoulder 16. The tongue is connected to the adapter above this shoulder 16. If the tongue 10 were joined to the adapter at a point in the same plane as shoulder 16, on tightening the sides of the skirt would tend to pivot about the point where the tongue is joined to the adapter, and this would cause the thickened portion 18 of the skirt to swing outwardly and upwardly, which, in turn, would pull the sides of the skirt away from the threads on the bottle. By providing the annular void 19 between the tongue and the shoulder 16 the flexing point is located above shoulder 16 and the tongue may be flexed without distortion of the skirt, thereby preventing the skirt from being lifted from the neck of the bottle when it is tightened.

Figure 2:
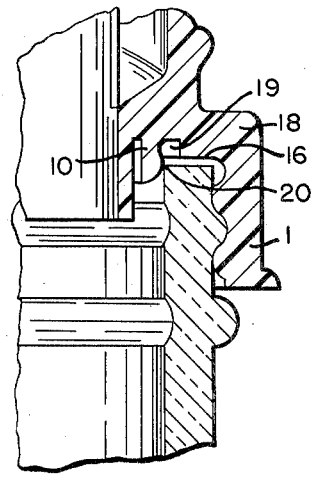
Fig. 2 is a fragmentary view of a portion of this adapter fastened to the neck of a bottle.

When the skirt is threaded onto a bottle the tongue 10 is flexed inwardly as shown in Fig. 2. The bottom of the outer surface of the thick portion of the tongue tapers inwardly, and this guides the tongue into the opening in the neck of the bottle as the opening squeezes it inwardly. If the diameter of the neck of the bottle is appreciably smaller than the outside diameter of the bead on the tongue the surface 12 does not pass entirely into the bottle but becomes seated against the inner edge 20 of the rim of the neck of the bottle to form a seal. Ordinarily the inward flexing of the tongue caused by the formation of such a seal is very slight. The top surface of the bottle need not bottom against the shoulder 16.

Figure 3:
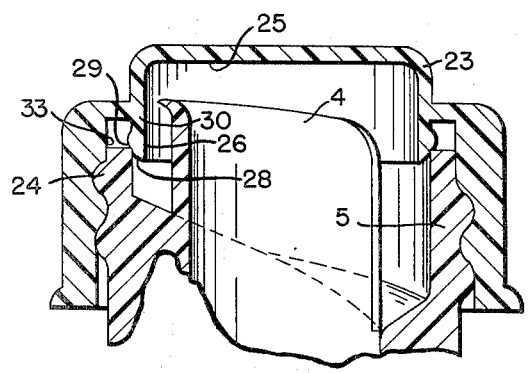
Fig. 3 shows a fragmentary portion of the upper end of the adapter shown in Fig. 1 with a closure cap applied thereto.

Fig. 3 shows the upper portion of the adapter shown in Fig. 1 with a closure cap 23 threaded onto the threads 24 which are formed on the outside surface of the wall 5. The upper portion of the pouring tube 4 extends upwardly into the dome 25 formed in the roof of the cap. To form a liquid-tight seal the closure cap is provided with an annular tongue 26 which projects downwardly from the circumference of the dome inside the cap. The surface 28 of bead 29 on this tongue is beveled downwardly and inwardly toward the bottom of the cap. When not under any strain the lower portion of the tongue flares outwardly somewhat toward the threads in the cap. The upper portion of the tongue is thinner than at the bead 29, and it is joined to the cap at 30, which is a considerable distance above the threads inside the cap.

When the cap is placed over the pouring tube the beveled surface 28 contacts the inner rim of the annular wall 5. As the cap is tightened the tongue is squeezed inwardly on all sides so that the beveled surface 28 wedges itself tightly against the inside rim of the annular wall 5. As the tongue is compressed it flexes inwardly about the point 30. The tongue will resist this compression and, due to the tightening action, the upper portion of the wall 5 will be expanded somewhat in diameter and will be pinched between the bead 29 and the flat, smooth wall 33 which is formed above the threads inside the cap. Preferably the threads inside the cap terminate below the tongue and the wall 33 opposite the tongue is smooth and vertical with no obstructions or irregularities which might jam against the upper rim of the wall 5 and prevent the cap from being screwed tightly in place. This sealing action is very effective in preventing leakage of liquid around the top of the adapter.

The closure cap 23 may be applied directly to the top of a bottle having the same size threads instead of being applied to an adapter, as shown in Fig. 3. A cap to be used directly on the neck of a bottle need not be domed, and ordinarily will have a flat top. A tongue similar to tongue 26 will project downwardly from the inner surface of the roof of such a cap and will be located radially inwardly from the threaded sides.

Figure 4:
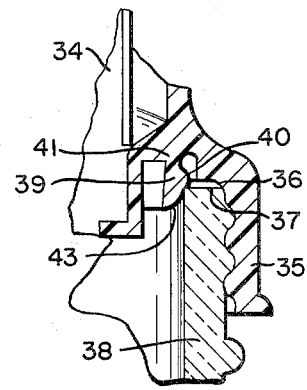
Fig. 4 is a fragmentary view of an adapter of the type shown in Fig. 1 with modified sealing means.

Fig. 4 shows a portion of an adapter 34 of the type shown in Fig. 1 but with a seal somewhat similar to the seal formed in the closure cap 23 of Fig. 3. It is to be understood that the skirt and sealing means shown in Fig. 4 are substantially symmetrical about the centerline indicated. The adapter is provided with a threaded skirt 35 and above the threads on the interior of it there is a fillet-shaped surface 36 which is adapted to press against the outer rim of the top surface 37 of a bottle neck 38 when the skirt is tightened. The tongue 39 is annular and is spaced radially inwardly from the threads. A thick bead 40 is formed at about the middle of the tongue and projects toward the thread. The tongue is joined to the adapter at 41 and flexes at point 41, which is above the fillet 36. The lower surface 43 of the bead slants downwardly and inwardly toward the pouring tube. As the skirt is threaded onto the bottle the surface 43 slides downwardly across the inner rim of the upper surface 37 causing the tongue to flex inwardly about the point 41. Both the inner and outer rims at the top of the bottle neck are pinched tightly. The surface 43 yields sufficiently to conform to irregularities in the rim of the bottle.

Figure 5:
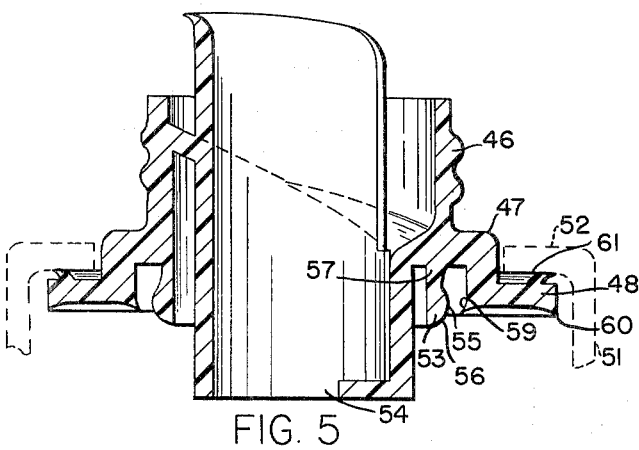
Fig. 5 is a cross-sectional view of an adapter with different sealing means.
Figure 6:
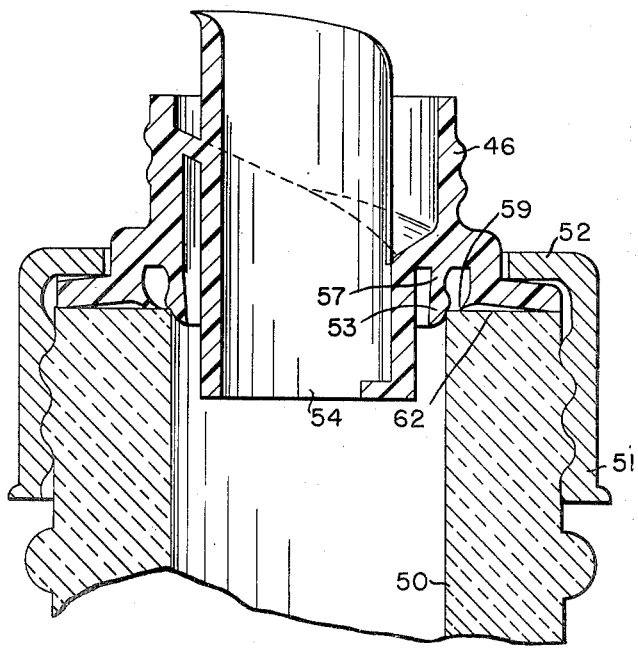
Fig. 6 is a cross-sectional view of the adapter shown in Fig. 5 fastened on the neck of a bottle.

The adapter in Fig. 5 is a run-back adapter of the type described in Fig. 1, but it is provided with different sealing means. At the base of the wall 46 which forms the run-back channel there is a stepped shoulder portion 47 and below this there is an annular wafer section 48. The wafer portion is designed to rest on the upper edge of neck 50 of a bottle, as is shown in Fig. 6. The adapter is fastened to the bottle by an auxiliary cap 51 which is a conventional type cap (made of hard rubber, hard phenolic resin, metal or the like) with a large opening in its roof through which the shoulder 47 fits when the cap is in place. The roof portion 52 of the cap 51 bears on the top of the wafer 48 and clamps it firmly to the top of the bottle neck.

The wafer 48 is designed to cooperate with the annular flexible tongue 53 which projects from the lower portion of the adapter and is spaced concentrically around the pouring tube 54. This tongue is formed with a thick bead portion 55 having a beveled lower surface 56. The tongue flexes from the point 57, which is above the wafer portion 48. A relatively thin, flexible, annular web 59 with sides which converge to a point, projects inwardly and downwardly from the bottom inner edge of the wafer portion. A similar flexible web 60 projects outwardly and downwardly from the bottom lower edge of the wafer. On the upper surface of the wafer and preferably spaced inwardly from its edge there is an annular projection 61 which protrudes somewhat above the top surface of the wafer and is flexible.

When the adapter is placed on the top of a bottle neck, the beveled surface 55 of the tongue will contact the inner rim of the top surface 62 of the bottle neck. Ordinarily the wafer 48 will not touch the neck of the bottle. The projecting webs 59 and 60 may contact the surface before pressure is applied but the tongue 53 may prevent such contact. The cap 51 is then placed over the wafer and is threaded onto the neck. The roof of the cap will first contact the projection 61 and fold this projection downwardly tight against the top of the wafer to form a tight seal between the top of the wafer and the roof and then the roof will force the wafer down toward the bottle. The web 60 will be flexed upwardly and outwardly and contact the outer rim of the neck of the bottle. The inner web 59 will be flexed upwardly and inwardly and will press against the upper surface of the bottle. As the cap is tightened the tongue 54 will be flexed inwardly as it is wedged into the neck of the bottle. Its beveled surface 55 will form a seal with the inner rim of the bottle neck. Several tight seals are formed at different locations. One purpose of the projection 61 on the top of the wafer 48 is to apply pressure to the middle of the top of the wafer to flex it downwardly and thus maintain the webs 59 and 60 in proper contact with the bottle neck. No gasket is necessary with this type of sealing means although a gasket may be employed if desired.

Figure 7:
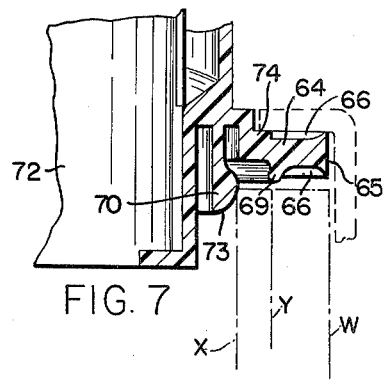
Fig. 7 is a fragmentary view showing an adapter with a modified form of sealing means.

The adapter shown in Fig. 7 is designed to be attached to a bottle by means of an auxiliary cap, such as cap 51 of Fig. 6. Such a cap is indicated in the dotted lines. Only a fragmentary section of the sealing portion of this adapter is shown in Fig. 7 and it is understood that the sealing portion is substantially symmetrical about the centerline indicated. This sealing means is designed particularly for adapters to be used with bottles having the same outside diameter but different wall thickness. The wafer portion 64 extends over the top surface of a bottle's neck, and the outer edge 65 will be approximately the same diameter as the outer diameter of the bottle's neck (indicated by the line W). Both the upper and lower edges around the outside of the wafer 65 are provided with a flexible web 66. When the cap is tightened the lower web is adapted to flex upwardly and press against the outer rim of the neck. The upper web will be deformed against the interior of the cap's roof to insure the application of pressure on the bottom web 66.

Spaced inwardly from the web 66 on the bottom of the wafer is a somewhat thicker, annular web 69. This latter web projects downwardly and inwardly. The adapter is also provided with the annular, flexible tongue 70 which is located concentrically around the pouring tube 72. This tongue is similar in design to the other tongues shown.

If the adapter is tightened on a thick-walled neck the inner surface of which is indicated by dotted line $x$, the lower, beveled surface 73 of tongue 70 presses against the inner rim of the neck and is flexed inwardly in the manner described for the previous adapters. The roof portion of the auxiliary cap such as cap 51 rests on the small ledge 74 and on the top of web 66 and bridges across the center of the wafer as indicated in the dotted lines before the cap is tightened. After it is tightened the web 69 will press against the top surface of the bottle's neck in a manner similar to that in which web 59 in Fig. 6 fits against the bottle 50. This pressure will usually cause the center of the wafer to bow upwardly so that it is pressed against the roof of the cap.

If the neck is thin-walled, the tongue 70 will have no effect as a seal. The web 69 will contact the inner rim of the inner wall indicated by the dotted line Y to form a tight seal.

A single mold for such an adapter will produce a produce that may be used on bottles of different wall thicknesses. Regardless of the thickness of the neck of the bottle, some portion of the webs formed on the wafer will make tight contact with the bottle and form a liquid-tight seal.

Figure 8:
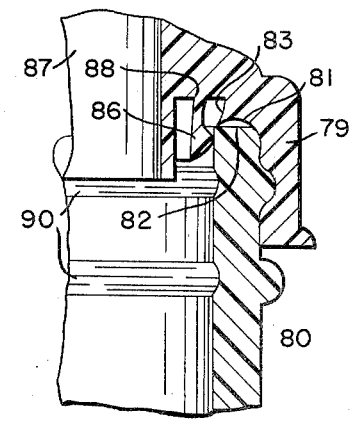
Fig. 8 is a fragmentary view of an adapter with other sealing means.
Figure 10A:
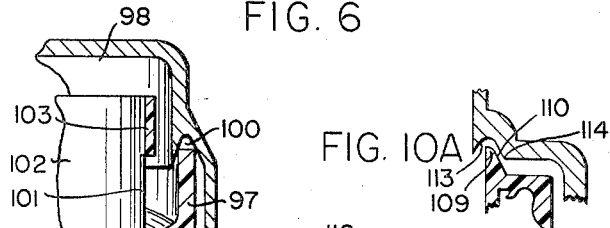
Fig. 10A is a detail showing the relation of the closure cap and sealing means on the adapter before they are brought into contact.

The sealing means on the adapter shown in Fig. 8 is designed more like that on the adapter of Fig. 1. It is provided with a threaded skirt 79 which, as shown, is threaded onto the neck of a plastic bottle 80. A fillet portion 81 is formed above the threads inside the skirt and this forms a tight seal against the outer rim of the bottle's upper surface 82 when the skirt is tightened in place. Around the inner portion of the fillet 81 a downwardly and inwardly directed flexible web 83 is formed. When the skirt is screwed onto a bottle, the web presses at or near the inner rim of the neck's upper surface.

Spaced radially inwardly from the web 83 is a tongue 86 which is formed concentrically around the pouring tube 87. This tongue is similar to the tongues described above but is adapted to be flexed inwardly and forced inside the neck in the manner shown. The tongue is joined to the adapter at the point 88 which is above the web 83 so that the threads in the skirt grip the neck threads tightly. The tongue presses outwardly against the inside surface of the bottle just below the inside rim. Usually there is a slight irregularity in the inner surface of the neck just opposite the threads as is indicated at 90. The tongue may be formed so that it projects a considerable distance into the neck, but preferably it does not extend to the irregularity opposite the starting point of the threads in the bottle. The yielding surface of the tongue will accommodate itself to irregularities in the surface of the bottle when under pressure, but such an irregularity as that indicated at 90 is objectionable because it reduces or entirely relieves the pressure of the bead against the bottle surface. For best results the tongue will press against an area of the inside surface between the top of the thread and the top of the bottle.

This adapter is particularly adapted for use on flexible plastic bottles since the pressure of the tongue 86 against the inner wall of the bottle's neck reinforces the neck of the bottle and prevents its collapsing when the bottle is squeezed or pressure is otherwise applied on the bottle. The pressure of the tongue is also effective in keeping the threads of the skirt tightly engaged with the bottle so that there is no danger of the cap being inadvertently pulled off the neck.

Figure 9:
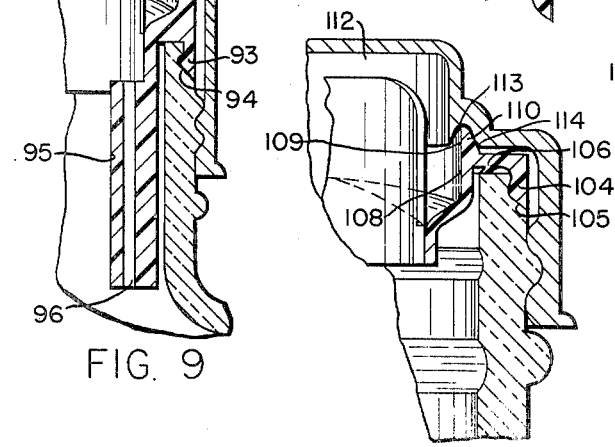
Fig. 9 is a fragmentary view of an adapter which snaps onto the neck of a bottle and a closure cap for this adapter.

Fig. 9 shows a run-back adapter which is provided with a short skirt 93 designed to be snapped into a groove 94 around the top of the bottle to fasten the adapter to the bottle. The run back portion of the adapter is located above the rim of the bottle's neck. This adapter is provided with a baffle 95 which extends down into the neck of the bottle. In cross section the baffle has the shape of a circular segment and a vent hole 96 extends longitudinally through the baffle. The hole 96 admits air into the bottle to replace the volume of liquid being poured out through the adapter. The liquid poured from the bottle flows along the flat side of the baffle. The baffle and the vent hole 96 cooperate so that a smooth stream of liquid issues from the adapter. This long baffle and vent are advantageously employed with small adapters used with narrow neck medicine or prescription bottles containing very fluid liquids.

This adapter is formed with a run-back channel and the top edge of the wall 97 which surrounds the run-back channel is substantially flat. A dome-shaped closure cap 98 is threaded onto the neck of the bottle over the skirt 93, as shown. This cap 98 is preferably of hard material although it may be a soft flexible material. On the underside of the cap, between the threads and the dome, there is an annular groove 100 shaped like an inverted V. The tapering sides of the groove press down on the inner and outer rim of the top of wall 97 when the cap is tightened. This arrangement forms a very effective double seal at the top of wall 97.

It may be noted that the slot 101 in pouring tube 102 of the adapter of Fig. 9 is slightly different in design than in the other run-back adapters shown in the drawings. The slot 101 or opening 102 does not extend to the upper edge of the pouring tube and this variation in the design is for manufacturing purposes. When molding a run-back adapter such as shown in Fig. 1 two cores are used. A number 1 core which is substantially cylindrical forms the interior surface of the pouring tube. The run back channel, the outside surface of the pouring tube, and the inside surface of the wall surrounding the run-back channel is formed with a number 2 core which is tubular and is located concentrically around a number 1 core. The clearance between the two cores is equal to the material thickness of the walls of the pouring tube. To form the slot in the back of the pouring tube a key is usually formed integrally with the number 1 core and projects therefrom to contact the number 2 core. With this arrangement flash is formed along the edges of the slot next to the outside surface of the pouring tube. When molding certain adapters, particularly those for small bottles, the amount of flash may be sufficient to obstruct the run back channel. To overcome this difficulty the key may be formed integrally with the number 2 core so that the flash, if any, is formed along the edge of the slot at the inside wall of the pouring tube. To avoid forming any flash around the top portion of the pouring tube when using this latter arrangement, a short key is used which forms only a short slot as indicated. The upper portion of the pouring tube is a continuous wall with an annular cross-sectional shape. The wall of the pouring tube above the slot is indicated by the section lines 103 in Fig. 9.

Figure 10:
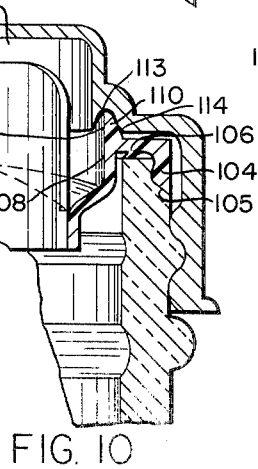
Fig. 10 is a fragmentary view of an adapter on the neck of a bottle and covered by a closure cap.

The adapter in Fig. 10 is formed with a skirt 104 which is adapted to snap onto a groove 105 in the neck of a bottle in the same manner that the adapter in Fig. 9 is attached, except that the inner side of the skirt 104 is formed with a flexible bead 106 which is spaced radially inward from the edge of the skirt. This bead is deformed against the top of the neck when the adapter is snapped into place, and it forms a very tight liquid seal between the bottle and the adapter. The rim around the top of the wall 108 which surrounds the run-back channel is provided with a projection 109. The outside surface 110 of the projection slants upwardly and inwardly away from the skirt 104 and it converges with the inside surface of the wall 108 to form a sharp edge. The closure cap 112 is preferably made of a hard material, although it may be formed of a flexible material and it is dome-shaped. Located inside of the cap around the base of the dome there is an inverted V-shaped groove 113. The corner side of the groove presses tightly against the sharp edge of the projection 109. The sharp edge 114 on the cap where the outer side of the groove 113 joins with the skirt, presses tightly against the surface 110. Thus, there are two sealing points: one where the sharp edge of the projection 109 meets the inner side of the groove 113 and the second where the outer side of groove 113 presses against the inclined surface 110 of the projection 109.

If the cap is of a hard material and the adapter soft, the cap will deform the portions against which it presses sufficiently to form an adequate seal. A seal is also formed if both the adapter and the closure cap are of soft, flexible material.

Figure 11:
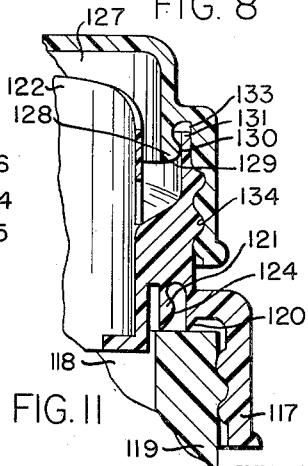
Fig. 11 is a fragmentary view of another type of adapter on a bottle and provided with a preferred closure cap.

The adapter shown in Fig. 11 is designed particularly for plastic bottles and may be used for either thick-neck or thin-neck bottles having the same outside diameter. The adapter is formed with a skirt 117 which is threaded onto the bottle 118 having a thick-neck 119. An effective seal is obtained by the annular, sharp-pointed bead 120 and the annular tongue 121, each of which surrounds the pouring tube 122 and is located radially inwardly from the skirt. The bottom of both the tongue and the bead press on the top surface of the bottle's neck when the skirt is tightened.

The same adapter may be used with thin-neck bottles. On such a bottle only the pointed bead 120 will press against the top surface of the neck and the beveled surface 124 of the tongue will press against the inner rim of the neck so that the tongue is flexed inwardly. With a thin-neck bottle the sealing means of this adapter will seal against the neck in about the same manner as the sealing means of the adapter shown in Fig. 6.

The closure cap 127 is dome-shaped. It is provided with an annular tongue 128 located immediately below the edges of the dome portion. The tongue is shaped with a beveled surface 129 and a thickened bead portion 130. When the cap is threaded onto the wall 131 the tongue projects into the run-back channel and the bead portion 130 presses on the inner surface of wall 131 below its rim. It is to be noted carefully that opposite the bead portion 130 of the tongue the inside surface of the skirt portion of the cap is a smooth vertical wall 133. The internal threads 134 formed inside the skirt of the cap terminate a substantial distance below the tongue. Wall 131 is relatively thin as shown in the drawing. As the cap is tightened the wall will have a tendency to expand in diameter due to the pressure of the tongue on the inside surface. (The tongue will also flex inwardly somewhat.) If the threads in the skirt extend up as far as the bead portion 130, the upper rim of the wall will be pressed into threaded portions when the wall is expanded and it will be very difficult or impossible to tighten the cap properly. By making the surface of the skirt of the cap opposite the thick portion of the tongue a smooth vertical wall; the cap is tightened easily. When the tongue first comes into contact with the wall the outer rim of the top is pressed against the smooth vertical surface and there is nothing on this surface to obstruct or jam against the rim.

In order to select an adapter best suited for a particular bottling operation consideration is given to the style and type of bottle (glass, plastic, etc.), the size of the bottle, the fluidity or viscosity of the liquid to be contained in the bottle, the bottling equipment in the plant where the bottles are filled, etc. If a bottle is a snap-on type, for example, and the opening through the neck is relatively wide (greater than about 5/8 inch diameter) an adapter of the design shown in Fig. 10 might be selected. The run-back channel of this adapter is located inside the neck of the bottle so that the adapter projects only a very short distance above the neck. The pouring tube, although considerably smaller than the opening through the neck, is still sufficiently large that a good stream of liquid may be poured through the pouring tube.

If, however, the opening in the neck is relatively small—for example, less than about 5/8 inch diameter—the design shown in Fig. 10 is not practical, since the diameter of the pouring tube would be so small that it would be difficult to pour a good stream. The smallest opening permissible with one liquid will not be satisfactory with liquid having different physical properties, such as viscosity, etc. For example, it has been found that it is difficult to pour water through a pouring tube of about 3/16 inch in diameter. The adapter shown in Fig. 9 is designed particularly to provide a pouring tube of the largest possible diameter in a small opening. All of the run-back channel on this adapter is located above the neck of the bottle so that the pouring tube may be formed nearly as large as the opening through the neck.

Figure 12:
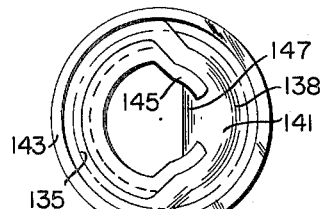
Fig. 12 is a plan view of an adapter having a special type of pouring tube.
Figure 13:
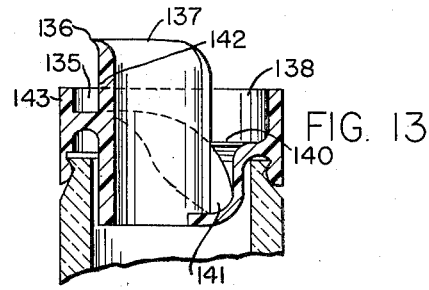
Fig. 13 is a side view in cross section showing the adapter of Fig. 12 fastened to a bottle.

For certain bottling operations it has been found that an adapter of the design shown in Fig. 9 projects too far above the neck of the bottle. The adapters may be knocked off the bottles during shipment. Under these conditions an adapter of the design shown in Figs. 12 and 13 is recommended. This adapter projects no farther above the neck than the adapter of Fig. 10, and it is provided with a sufficiently large pouring tube to permit a good stream to be poured through it even for small-neck bottles. It is designed so that the front portion 135 of the run-back channel, immediately below the pouring lip 136 of the pouring tube 137, is located above the neck of the bottle (see Fig. 13). The portion 138 of the run-back channel which is in back of the pouring tube is considerably wider than the portion 135 of the channel. It is stepped down at 140 and the deeper portion 141 of the channel is inside the neck of the bottle below its upper rim.

The cross-sectional shape of the pouring tube 137 is not annular as in the adapters described in the foregoing. Its cross-sectional shape is shown in the plan view of Fig. 12. The front wall 142 of the pouring tube is concentric with the outer wall 143 around the run-back channel. The back of the pouring tube is formed by the sides 145 which converge sharply toward one another from both sides of the front wall 143. The resulting shape of the pouring tube is such that an adequate stream of liquid may be poured through it even though the baffle 147 and the deep portion 141 of the run-back channel immediately above the baffle are located inside the neck of the bottle.

This adapter is designed to be snapped on to the bottle in the same manner that the adapter in Fig. 9 is fastened. It may be covered with a closure cap similar to the type shown in Fig. 9. This adapter advantageously projects only a very slight distance above the rim of the bottle yet a large size pouring tube may be employed. It requires less material than an adapter which is higher, such as the adapter of Fig. 9, for example, and this results in a lower unit cost for both the adapter and closure cap. This adapter of Figs. 12 and 13 is so constructed as to permit it to be applied to the bottle automatically and at high speeds. It is adaptable to such operations as are performed on movable conveyors using automatic screw-down closure-cap applicators. The machine for applying this spout to the bottle should be installed ahead of the cap applicator thereby becoming another station in the sequence of operations.

Figure 14:
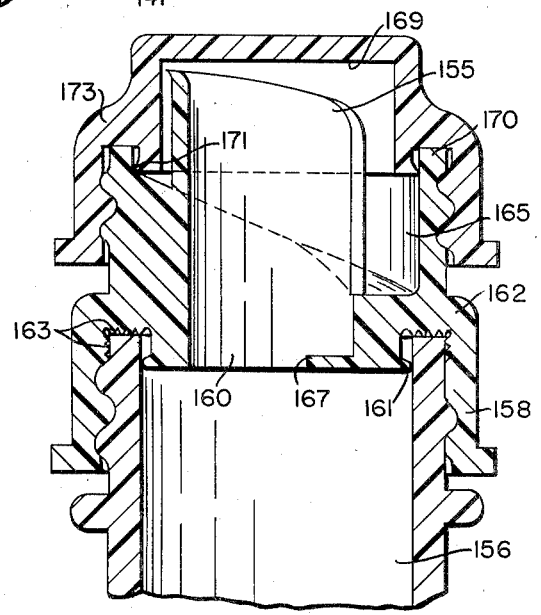
Fig. 14 is a section of an adapter screwed on to a bottle, with a cap screwed on to the adapter.

Fig. 14 shows a flexible plastic spout 155 which is designed particularly for use on a flexible plastic bottle 156. It might likewise be used on other bottles such as rigid plastic bottles, glass bottles, tin cans, etc. This spout is provided with a skirt 158 which is threaded onto the neck of the bottle. The bottom portion of the pouring tube 160 inside the skirt is provided with an annular bead 161 which presses against the inside surface of the neck of the bottle just below its rim when the skirt is screwed in place. This bead reinforces the neck so that it is not apt to collapse and permit the skirt to be pulled easily over the threads on the outside of the neck. The portion 162 of the spout by which the skirt is connected to the pouring tube is relatively thick and this prevents any appreciable outward bending of the sides of the skirt when the skirt is tightened onto the bottle. The thick portion together with the bead makes it very difficult to turn the skirt beyond the limit of the threads on the neck. The horizontal and vertical surfaces 163 inside the skirt are serrated and these serrations are in contact with the rim and the outside surface of the neck above the threads when the skirt is tightened. These serrations form a tight seal around the rim of the neck. The downward pull as the adapter is threaded onto the container pulls the horizontal serrations against the top edge of the container neck; the bead 161 exerts outward pressure against the inner wall of the neck of the container and draws the vertical serrations against the outer wall of the container. The return channel 165 surrounds the pouring tube in the usual manner and the baffle 167 is provided across the bottom of the pouring tube. A dome-shaped closure cap 169 is threaded onto the outside surface of wall 170 which forms the return channel. This closure cap is advantageously formed with a downwardly and outwardly turned bead 171 which presses against the inner surface of wall 170 when the cap is in place and serves the same function as the bead 161 at the base of the pouring tube. Bead 171 is not wide enough to block off the channel and prevent liquid draining from the spot reaching the channel. The portions 173 of the closure cap are thick to prevent the threaded sides of the cap from being bent outwardly when it is screwed onto the wall 170.

Figure 15:
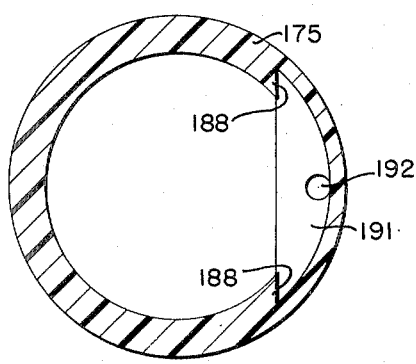
Fig. 15 is a section on the line 15—15 of the adapter of Fig. 16.
Figure 16:
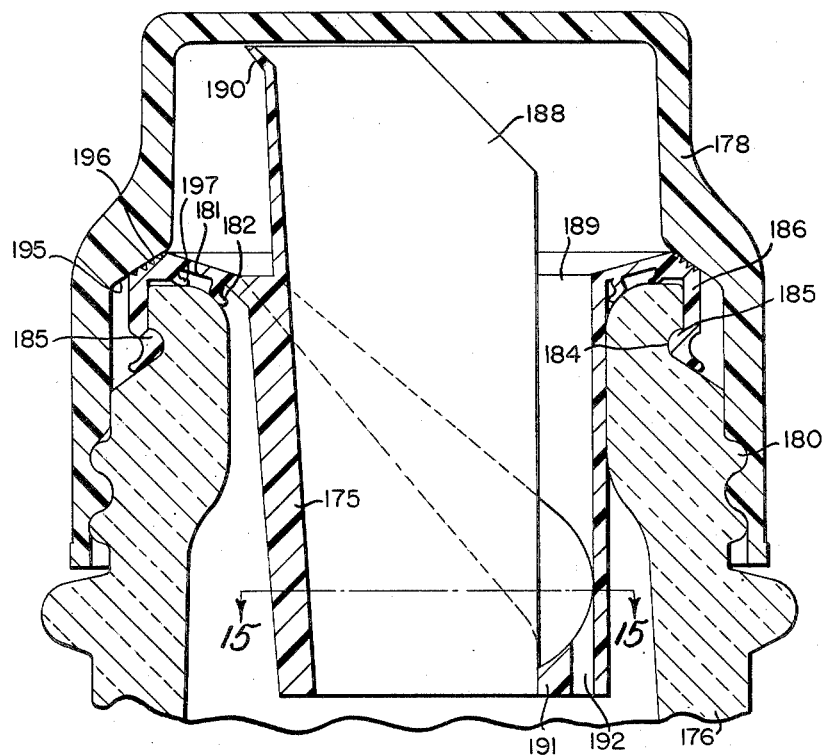
Fig. 16 is a section through an adapter snapped on to a bottle, with a cap screwed on to the bottle and making a liquid-tight seal with the adapter, the adapter having an air-inlet opening in a baffle thereof.

The adapter 175 of Figs. 15 and 16 is designed to extend down into a bottle or other container 176 so that little of it extends above the top of the container. Because of this, the container may be closed with a standard metal or plastic cap 178 on standard bottling equipment. The bottle 176 is shown as being formed of glass, but may be flexible plastic, hard rubber, metal, or other rigid material. It is of a standard type and is provided with external threads 180 on which the cap 178 is threaded. The entrance to the neck is bevelled at 181, and the tongue 182 of the flexible adapter makes sealing contact with this surface. The adapter may be made of polyethylene or rubber or other flexible and somewhat stretchable plastic. The outer surface of the neck of the bottle above the threads 180 is of reduced diameter and provided with the groove 184 to receive the bead 185 on the inner surface of the flange 186 of the adapter. The surface of the flange opposite the bead 185 is hollowed out to facilitate removal of the flange from the mold. The flange is sufficiently stretchable to be readily slipped over the end of the bottle neck until the bead is engaged in the groove.

The adapter is formed with the spout 188, which is open at the back (Fig. 15) and the channel 189 which collects drip from the pouring lip 190 and any liquid which drains down the outer surface of the spout drains down the channel at a steep angle through said opening and over the bottom 191 of the rear of the channel, back into the container. The channel is steep to facilitate the drainage of viscous materials such as corn syrup, molasses, heavy oils, etc. The air inlet 192 through the bottom portion 191 facilitates the entrance of air into the container while liquid is being poured out of it. Such air entrance does not interfere with the flow of liquid through the spout. The spout tapers downwardly and thus eliminates the necessity of providing a baffle to insure even flow of the liquid while pouring, as described in my aforesaid Patent 2,601,039.

The cap 178 is of rigid material such as hard rubber, Bakelite, tin, aluminum, etc. The downwardly and outwardly slanting inner surface 195 which connects the upper portion of the cap with the bottom portion which is of increased diameter, makes sealing contact with the flexible serrations 196 on the contacting surface of the adapter which has the same slope as the surface 195 of the cap. Each serration is continuous around the adapter. Their number, size, and the angle at which their sides slant is immaterial so long as the serrations are sufficiently flexible to make a tight, continuous multiple seal with the inner surface 195 of the cap. The rib or tongue 197 on the under side of the bridge of the adapter makes sealing contact with the top edge of the bottle, and provides a cushion support for the bridge which insures sealing contact between the serrations and the surface 195 of the cap.

The rib 197 is advantageously made with a vertical inner surface and the outer surface sloping downwardly and inwardly toward it. This rib is easily removed from the mold. In the drawing, the rib is shown as being flexed inwardly.

The tongue 182 and rib 197 and also the bead 185 prevent leakage of liquid between the adapter and the bottle. The seal between the serrations 196 and the surface 195 of the cap prevents leakage between the adapter and the cap. Even though the capped bottle be upset, no liquid can leak from it. When returned to the upright position all liquid above the adapter will drain through the pouring spout 188 or through the channel 189 to the rear of the spout and thence back into the bottle.

Figure 17:
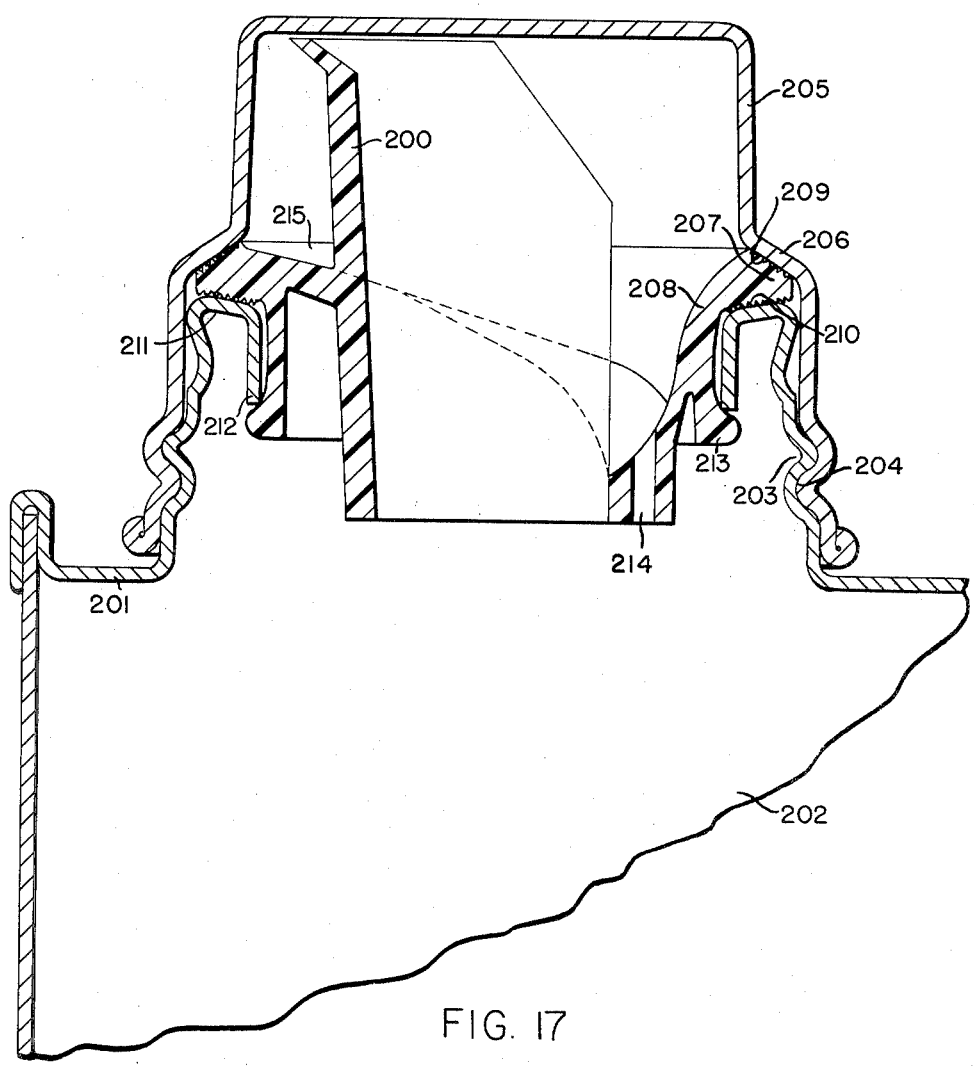
Fig. 17 is a section through an adapter in a tin can.

The adapter 200 of Fig. 17 is in the opening in the top 201 of the metal container 202. The opening is provided with threads 203, and there are complementary threads 204 on the cap 205. This cap may be rigid or flexible. Fig. 17 shows the cap of metal, although it may be made of plastic. The upper portion of smaller diameter is connected with the larger portion by the outwardly tapering wall 206, the inner surface of which squeezes the flange 207 of the resilient adapter 208. The body of the adapter is stiff enough so that its outside diameter is not substantially reduced by the squeezing pressure of the cap against the wall 211 of the container. The upper and lower surfaces 209 and 210, respectively, of the flange have substantially the same slope as the inner surface of the portion 206 of the cap, and the wall 211 of the container which surrounds the opening. Both surfaces 209 and 210 are serrated and make a multiple seal with the cap and container at the contacting surfaces. The number of serrations, the height, and the slant of their walls is immaterial so long as tight continuous multiple seals are formed. The adapter is held in the opening by the enlargement 213 at the base of the outer wall of the adapter. This enlargement may be continuous around the entire circumference of the adapter, but several spaced enlargements may be employed where one continuous stiff enlargement might not be easily introduced into the opening of the container and removed therefrom. The tendency of the enlargement to spread outwardly should be such as to form a tight seal with the downwardly directed flange 212 of the metal container regardless of the exact length of this flange. The outward pressure of the enlargement 213 or the flanges to which it is attached is such as to make tight contact between the serrations 210 and the container wall 211. It is not necessary that the outer surface of the flange of the adapter contact the upper portion of the flange 212 of the container as shown; it only being necessary that sealing contact is provided at one point. The air inlet 214 serves the same purpose as the air inlet 192 of Fig. 16. As the cap is tightened on the container, the flange 207 is squeezed between the cap and the inner surface of the wall 211 of the container, making a tight seal around the container both between the cap and the adapter, and between the container and the adapter. Thus, if the capped container is upset at any time, no liquid can flow beyond these seals, either above or below the adapter. The container will not leak even though the cap does not make a tight seal with the container. When the upset container is righted, all liquid above the adapter will drain through the pouring spout or through the channel 215, around the spout, and back into the container, through the opening at the rear of the spout.

Figure 17 is carried forward to application Serial No. 587,711 filed May 28, 1956, and the application of adapters to metal containers is claimed therein.

The foregoing fittings with caps, etc., are adapted for attachment to plastic and glass bottles and tin containers, etc. They are designed to meet different needs and their particular advantages will be discussed generally in what follows. The different figures illustrate different features which may be used in different combinations and the spouts may be used generally, or the spout may be designed for a specific purpose as generally suggested in what follows.

The adapter shown in Fig. 1 is designed for general application and the tongue 10 may seal against the inner edge of the mouth of the bottle as shown in Fig. 2, or may seal against the inner surface of the mouth of the bottle below its top edge if the bottle neck is of slightly greater internal diameter than the diameter of the bottle shown in Fig. 2. The modification shown in Fig. 4 provides for the inner surface of the skirt to be squeezed tight against the top of the outer surface of the bottle in a manner not contemplated by the design of the skirt shown in Fig. 2.

The tongue 26 of Fig. 3 on the inner surface of the cap presses against the inner edge of the wall of the adapter so that the wall of the adapter is squeezed between the skirt of the cap and this tongue. This forms a tight seal which prevents any liquid from escaping through the adapter in the event the bottle is upset. The cap is necessarily made of flexible and resilient material such as polyethylene, etc., in order to properly squeeze the top of the wall between the tongue and the skirt of the cap. The adapter may be made of either soft or hard material, but if it is provided with a tongue, such as tongue 10 of Fig. 1, it is necessary that the adapter likewise be made of resilient and flexible material in order to provide a proper seal and eliminate the use of a gasket. The tongue of the cap shown in Fig. 3 makes a tight seal with the wall of the adapter, regardless of the nature of the seal formed between the adapter and the container, whether or not a gasket is employed.

Figs. 5 to 7 show different types of flanges to be used on adapters to be held to the container by hard caps. Various beads, tongues, etc., may be used to form a tight seal depending upon the nature of the application.

It will be noted that in Fig. 9 the cap 98 is threaded directly onto the bottle which is illustrated as being formed of glass. The cap may be a metal cap or a cap of hard plastic such as a phenolic resin, a resin of the urea, melamine or styrene type, etc. The adapter is of flexible resilient material such as polyethylene, etc. The top of the wall of the adapter is squeezed by the annular groove 100 in the cap and this prevents leakage of any liquid which may flow through the adapter when the bottle is upset. There is likewise a tight seal between the adapter and the bottle formed by the short skirt 93 in the groove 94 which prevents leakage of liquid from underneath the adapter. These two seals at the top and the bottom of the adapter prevent any possibility of liquid escaping. As the cap is screwed down on the threads of the container, the groove 100 squeezes the top of the wall making a sealing contact. The downward pressure is against the top edge of the bottle and the wall is thick enough so as not to collapse when this pressure is applied to it. Generally, when a hard cap is used on a hard bottle, it is necessary to employ a gasket to prevent leakage. No gasket is required in this construction.

The adapter shown in Fig. 13 is supported entirely by the downwardly projecting flange and tongue below the wall which holds the run-back adapter. This provides maximum space within the bottle neck for the pouring outlet and permits the design of an outlet with maximum inside diameter. It is noted that the front half 135 of the run-back channel is located above the top of the wall of the neck of the bottle or other container and is not located within it whereby a pouring spout of maximum diameter is made possible.

The composition of the container and of the cap, as well as the composition of the adapter, will be selected so that no damage will be done to the nature of the liquid which is packaged. This is true of all of the constructions disclosed herein. It is known in the industry that certain liquids develop a toxic product when they contact certain resins, and it is also known that certain acids or strong bases have a deleterious effect on other resins. Thus the resin, or other material used for the bottle and the cap, will be selected so as to prevent any detriment to the material being packaged. Polyethylene is quite resistant to chemicals and ordinarily may be used for the manufacture of the adapter, but on occasion, other resilient plastics will be required. It is especially important that in packaging medicines, particular attention be given to the selection of the material employed for the manufacture of the container, spout, and cap. Regardless of the composition of these materials the flexible adapter is useful and forms sealing contact with both the container and the cap. Difficulty has been experienced where polyethylene, for example, is employed as a cap for a glass bottle because, when heated either by packaging a hot liquid in the bottle or by storing the packaged material in a heated place, the pressure generated within the bottle tends to loosen the cap. Moreover, a polyethylene cap or adapter threaded on a heated glass bottle tends to soften at the threads due to the heat and a tight seal cannot be formed. The heat of the bottle may be due to hot material packaged in it. Also difficulty has been experienced in tightening a polyethylene cap on the threads of a glass bottle due to the tendency of the polyethylene to climb the threads and loosen the seal. Polyethylene advantageously may be used in the manner disclosed in Fig. 9.

The cap and the container may be hard materials such as glass, phenolics, metal, etc., which do not make a tight seal. The use of a gasket is avoided by using an adapter of polyethylene or other resilient material and producing therewith a tight seal with both the cap and container. This is illustrated in Fig. 9 and other figures of the drawing. There is no tendency of the cap, for instance the cap 98 of Fig. 9, to climb on the threads and break the seal between the wall of the adapter and the groove 100 on the underside of the cap. Likewise the combination prevents reduction in downward pressure on the wall of the adapter which might result in leakage between the adapter and the top of the bottle.

Although generally the fittings shown herein will be used without gaskets, a gasket may be used with each of the fittings. Ordinarily there will be no advantage gained by using a gasket with fittings having wafer-like projections such as is illustrated in Figs. 5, 6, and 7, or the fittings shown in Figs. 9 and 10. Each of the pouring devices shown in the several figures may be properly shaped at the bottom and then welded, fused, or otherwise affixed permanently to the bottle. For example, if an adapter and bottle are both made of polyethylene or other thermoplastic material, the two may be placed in contact with one another and heated, as by a high frequency current, until the adapter becomes permanently welded to the bottle. Alternatively, the two may be cemented together or otherwise adhered to one another. Also the bottle or other container may be molded in halves or other sections with a half or other section of the adapter molded integrally therewith, and the sections may then be adhered to one another to form the completed unit. Furthermore, the pouring devices may be made integral with the outlet of a tin can or other metal container. For instance, the outer wall which surrounds the run-back channel may be made integral with the body and outlet of the container, and the pouring spout may be made separate and inserted in the portion integral with the container and soldered or otherwise fastened to it. A similar arrangement for making the outer part of the adapter integral with a bottle is shown in Figs. 20—21 of U. S. 2,601,039 which are Figs. 26 and 27 of my copending application S. N. 290,227. If desired, the inner member of the spout may be flared out and a spring or other means may be provided to hold it in place. The invention is defined in the appended claims.

What I claim is:

1. A resilient adapter adapted to fit inside and over the wall of a circular opening in a container, the adapter including an outwardly and downwardly extending flange with a bead on the inner surface of the downwardly extending portion adapted to fit in a groove in the outer surface of said wall, the outer end of said flange slanting outwardly and downwardly and having closely spaced, continuous, generally circular serrations thereon adapted to form a multiple seal with the inner surface of a cap placed thereagainst, projections on the under surface of the flange adapted to form a seal with the end of said wall, a pouring outlet extending from one end of the adapter to the other and terminating in a pouring spout which extends above the flange, a pouring lip on the front of the spout, a channel around the spout which slopes downwardly on both sides of the spout from the front of the adapter to its rear, the rear of the channel opening into the pouring outlet, and an air inlet through the rear of the channel above its lowest point and substantially parallel with the opening through the pouring outlet.

2. A container with an opening therein, a fitting in the opening, a hole through the fitting designed to serve as a pouring outlet, a rigid cap enclosing the fitting and screwed on to the container, the inner diameter of the top of the cap being less than the inner diameter of the lower portion of the cap with the wall portion connecting the two having an outwardly and downwardly slanting inner surface, the fitting contacting said wall portion around the hole and being resilient, thereby making a seal therewith.

3. A container with an opening therein, a fitting in the opening, a hole through the fitting designed to serve as a pouring outlet, a rigid cap enclosing the fitting and screwed on to the container, the inner diameter of the top of the cap being less than the inner diameter of the lower portion of the cap with the wall portion connecting the two forming a seal about the hole, the portion of the fitting forming the seal being resilient.

4. A container with an opening therein, a fitting in the opening, a hole through the fitting designed to serve as a pouring outlet, a rigid cap enclosing the fitting and screwed on to the container, the inner diameter of the top of the cap being less than the inner diameter of the lower portion of the cap with the wall portion connecting the two having an outwardly and downwardly slanting inner surface, the surface of the fitting contacting said wall portion being formed with resilient serrations which are continuous around the container.

5. A container with a projecting wall forming an opening, a fitting of resilient material over the end of said wall, a pouring outlet extending through the fitting and closely spaced continuous serrations on the inner surface of the fitting which surround the pouring outlet and form a multiple seal with the end of said wall.

6. A container with a projecting wall forming an opening, a fitting of resilient material over the end of said wall, a pouring outlet extending through the fitting and closely spaced continuous serrations on the inner surface of the fitting which surround the pouring outlet and form a multiple seal with the wall both on said end thereof and on the outer surface thereof near said end.

7. A fitting for a circular opening having a laterally extending flange of resilient material and closely spaced continuous and generally circular serrations on opposite surfaces of the flange adapted to form multiple seals with surfaces between which the flange is squeezed.

8. A fitting for a circular opening having a laterally extending flange of resilient material and closely spaced continuous and generally circular serrations on opposite surfaces of the flange adapted to form multiple seals with surfaces between which the flange is squeezed, the flange tapering outwardly so that its outer edge is thinner than any portion inward therefrom.

9. An adapter for the opening in a container, which adapter includes an opening therethrough designed to serve as a pouring outlet, the upper end of the wall of the opening terminating in a pouring spout, an opening through the wall at the rear of the container and a channel around the opening defined by an outer wall, the channel slanting downwardly to the opening for the purpose of collecting liquid which drips from the pouring spout and drains down its outer surface and returning the collected liquid to the container through said opening in the wall, and an air inlet through the rear of the channel which communicates with the interior of the container so that when the adapter is in use and liquid poured therethrough fills the pouring spout, air may enter the container through the air inlet.

10. An adapter for the opening in a container, which adapter includes an opening therethrough designed to serve as a pouring outlet, the upper end of the wall of the opening terminating in a pouring spout, an opening through the wall at the rear of the container and a channel around the opening defined by an outer wall, the channel slanting downwardly to the opening for the purpose of collecting liquid which drips from the pouring spout and drains down its outer surface and returning the collected liquid to the container through said opening in the wall, and an air inlet passing through the bottom of the channel at the rear thereof, the opening which serves as a pouring outlet and the air inlet being substantially parallel.

11. A container with an opening therein, the opening being defined by an annular wall, an adapter in the opening, the adapter having a passage therethrough with a pouring lip at the front of the outer end thereof, a channel around the passage which drains from under the lip at the front of the adapter to the rear, with means at the rear to provide drainage therefrom into the container, under the channel and extending downwardly therefrom a contact wall spaced outwardly from the wall that immediately surrounds the passage, the outer surface of said contact wall being in contact with said annular wall, and at the base of the contact wall a bead which projects outwardly and is engaged under the bottom of said annular wall that defines the opening in the container.

References Cited in the file of this patent

UNITED STATES PATENTS

| | | |
|---|---|---|
| 555,395 | Noice | Feb. 25, 1896 |
| 1,754,776 | Stanley | Apr. 15, 1930 |
| 2,135,237 | Lewis et al. | Nov. 1, 1938 |
| 2,208,899 | Freeman | July 23, 1940 |
| 2,303,733 | Freeman | Dec. 1, 1942 |

FOREIGN PATENTS

| | | |
|---|---|---|
| 558,998 | Great Britain | Jan. 31, 1944 |
| 653,023 | Great Britain | of 1945 |